United States Patent [19]

Chang et al.

[11] Patent Number: 5,444,332
[45] Date of Patent: Aug. 22, 1995

[54] HOLLOW - CATHODE ELECTRODE FOR HIGH-POWER, HIGH-PRESSURE DISCHARGE DEVICES

[76] Inventors: Jim J. Chang, 7644 Ashford Way, Dublin, Calif. 94568; Terry W. Alger, 901 Renown Dr., Tracy, Calif. 95376

[21] Appl. No.: 133,400

[22] Filed: Oct. 8, 1993

[51] Int. Cl.$^6$ .............................................. H01J 1/30
[52] U.S. Cl. .................................. 313/618; 313/632; 313/349; 372/87
[58] Field of Search ............... 313/618, 631, 632, 349, 313/326; 372/87, 88

[56] References Cited

U.S. PATENT DOCUMENTS 4,945,545  7/1990  Piper ................................ 372/87

OTHER PUBLICATIONS

A. D. White, New Hollow Cathode Glow Discharge, Journal of Applied Physics, vol. 30, No. 5, May 1959.

*Primary Examiner*—Donald J. Yusko
*Assistant Examiner*—Michael A. Day
*Attorney, Agent, or Firm*—Miguel A. Valdes; William C. Daubenspeck; William R. Moser

[57] ABSTRACT

Several different cold cathode configurations for a gas discharge device each having a plurality of grooves of selected spacing, depth and width to improve the emission of electrons in a gas discharge device. Each of the cold cathode configurations can be machined from a single piece of a selected material. Several of the configurations can be assembled with individual elements which is easily seen from the various figures.

19 Claims, 6 Drawing Sheets

HOLLOW - CATHODE ELECTRODE FOR HIGH-POWER, HIGH-PRESSURE DISCHARGE DEVICES

STATEMENT OF GOVERNMENT RIGHTS

The United States Government has rights in this invention pursuant to Contract No. W-7405-ENG-48 between the United States Department of Energy and University of California.

BACKGROUND OF THE INVENTION

The present invention relates in general to an electrode for gas discharge devices, and more particularly to hollow cathodes for use in high-pressure, high-power discharge devices In general a low-pressure (i.e., lower than one torr) hollow cathode discharge, is a spectroscopic light source of relatively high emission efficiency, low power consumption and small line width through Doppler broadening. The hollow cathode could assume several designs, including a hollow cylindrical cathode or a double (i.e two-plate) cathode. The characteristics of a hollow cathode discharge device are described in an article entitled "New Hollow Cathode Glow Discharge" by A. D. White, in the Journal of Applied Sciences, volume 30, number 5, May 1959 issue.

In a hollow cathode discharge device, the region that is adjacent to the cathode surface is referred to as the "cathode fall region", "cathode dark space" or "cathode hollow space". The voltage drop across this cathode fall region is referred to as the "cathode-fall voltage", and the thickness of this region is referred to as the "cathode-fall thickness". The cathode-fall voltage varies proportionally to the discharge-current density (i.e the electrical current per unit electrode surface area), while the cathode-fall thickness varies inversely with respect to the discharge current density.

In high-power gas discharge devices, such as lasers, gaseous switches, flash lamps and the like, the current density at the electrode is usually very high because of the high discharge current requirement. A high current density would require a high cathode-fall voltage, and therefore, a smaller cathode-fall thickness at the cathode. As a result of a large cathode-fall voltage drop across the small cathode-fall thickness, the electrode impedance is high, which causes excessive energy to be "deposited" or dissipated as heat at the cathode. This large energy deposition can initiate "thermal run-away effect".

Such thermal run-away effect results in "discharge instability" at the cathode. Additionally, when higher pressure gases are used in the gas discharge device, the cathode impedance increases further, and the thermal run-away effect worsens.

In a stable discharge, the discharge at the electrode follows a diffused glow pattern. On the other hand, when discharge instability occurs, the discharge pattern at the cathode appears as several confined intense "streamers", which move along the electrode surface in an uncontrollable pattern. Such intense streamers will degrade the discharge performance of the cathode, and will shorten its effective durability.

Additionally, sputtering debris is produced at the cathode, and is caused to drift away from the cathode, toward the anode and the gas or plasma chamber. The debris contaminates the discharge chamber, and further reduces the efficiency of the discharge device. When the efficiency reaches, or drops below an unacceptable level, the discharge device is either replaced or refurbished.

Furthermore, conventional hollow cathodes have relatively small cathode areas, so as to effectively maintain what is referred to as "hollow cathode effect". The hollow cathode effect occurs when the primary electrons, which are initially produced at the cathode, enter the fall region of one cathode plate, and after retardation, are "repelled" and accelerated to the fall region of the other cathode plate.

The electrons are repeatedly bounced back and forth between the two cathode plates, traversing the hollow space therebetween, and generating additional secondary electrons. Such oscillatory motion of the electrons continues until the electrons move away from the hollow space, toward the anode, due to the cathode-anode field.

Wherefore, the hollow cathode effect has the following two characteristic features:

1. The photo-electric (i.e, photon induced) electron emission from the cathode is more efficient because more UV photons from the cathode glow are captured by the hollow cathode. The two plates of the cathode confine these UV photons within the narrow hollow space.
2. The oscillatory travel of the electrons within the hollow space increases the length of the travel path of the electrons, which greatly enhances the electron multiplication through collisional ionization with neutral gas atoms.

As a result, a hollow cathode can achieve higher current density at a lower cathode fall voltage, because of a more efficient free-electron generation. However, the size of conventional hollow cathodes is relatively small because the size or thickness of the hollow space must be kept small enough, in order to maintain an efficient hollow cathode effect.

For example, the multiplication result of the cathode-fall thickness and the gas pressure is normally kept within the 0.1 cm-torr range, for an efficient hollow cathode discharge. Consequently, the use of the hollow cathode discharge devices in high-pressure, high-power applications is severely limited, due to the size limitation of the cathode in particular, and the discharge device in general.

Therefore, it would be desirable to have a new hollow cathode which is efficiently usable in high-pressure, high-power gas discharge devices.

SUMMARY OF THE INVENTION

It is an object of the present invention to address the foregoing concerns, and to provide adequate solutions thereto.

It is another object of the present invention to teach a new design for a hollow cathode that is capable of being efficiently used in high-pressure, high-power gas discharge devices, such as lasers, gaseous switches, flash lamps and like devices.

It is yet another object of the present invention to significantly improve the discharge capability of such discharge devices.

It is still another object of the present invention to prolong the effective life or durability of these discharge devices.

Briefly, the foregoing and other objects are achieved by providing a hollow cathode electrode for use in high-pressure, high-power gas discharge devices. The cathode is formed of a plurality of individual hollow cathodes, such that each individual hollow cathode is, in turn, formed of two successively arranged cathode elements that are distally spaced apart, for defining a hollow space therebetween, and a spacer which fills at least a portion of said hollow space.

The cathode elements are interleaved with corresponding spacers, such that the cathode becomes a combination of a plurality of sequentially arranged individual hollow cathodes.

Each hollow space or gap has a thickness and a depth. The thickness ranges between 5 mils and 20 mils, and the depth is proportional to the thickness. For instance, the thickness could range between 10 to 20 times the thickness. In some applications, some hollow spaces have different thicknesses.

The effective hollow cathode space includes the sum of all the hollow cathode spaces between the cathode elements. Such effective hollow cathode space is therefore significantly increased, without increasing the dimensions of the cathode or the discharge devices to prohibitive magnitudes. The improved electron emission resulting from such effective hollow cathode effect leads to a more stable electron discharge at the cathode.

The "effective" electrode surface includes the sum of all the surfaces of the cathode elements that are exposed to discharge. In order to spread the discharge over such effective electrode surface, a uniform-field profile can be applied to enhance the use of the hollow cathode spaces, at different regions of the cathode, such that the electrical field along the cathode surface is uniform.

The dimensions of the hollow cathode spaces between the various cathode elements are selected to accommodate the discharge pressure range, for efficient electron emission. In certain applications, there is limited room available to design a uniform-field cathode profile, and consequently, different hollow cathode spaces and depths can be selected between different cathode elements, in order to compensate for a non-uniform field distribution across the cathode.

The cathode elements and the spacers therebetween can be bonded, such as by diffusion bonding, for improved heat transfer and cathode cooling.

When precision machining (such as EDM or laser machining) can be used, each individual hollow cathode gap can also be machined from a single solid piece electrode, instead of being formed with multiple disk elements.

BRIEF DESCRIPTION OF THE DRAWINGS

The above and other features of the present invention and the manner of attaining them, will become apparent, and the invention itself will be best understood, by reference to the following description and the accompanying drawings, wherein.

DETAILED DESCRIPTION OF THE PREFERRED EMBODIMENT

Figure 1:
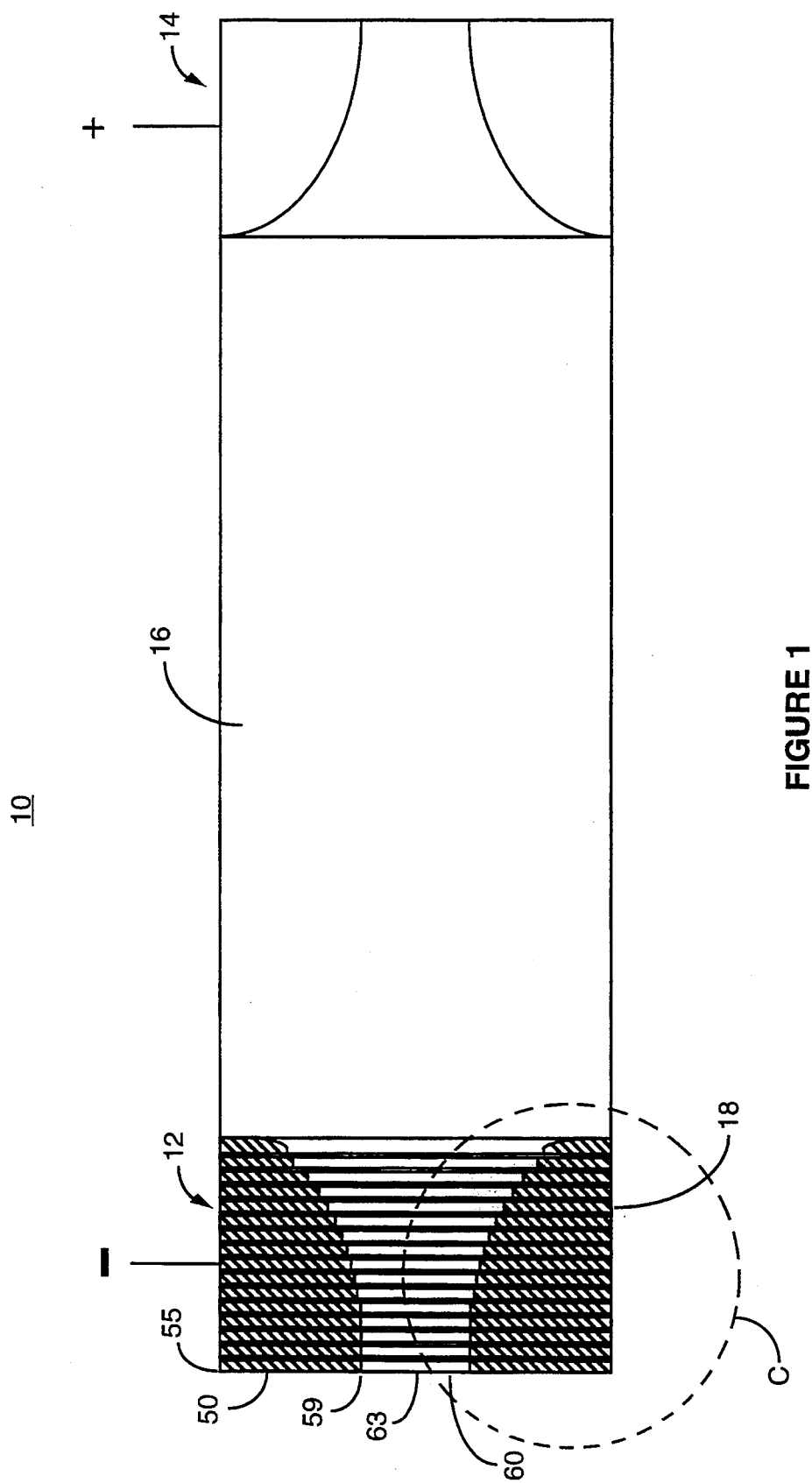
FIG. 1 is a cross-sectional schematic side view of a hollow cathode constructed according to the present invention, for use in a gas discharge device.
Figure 2:
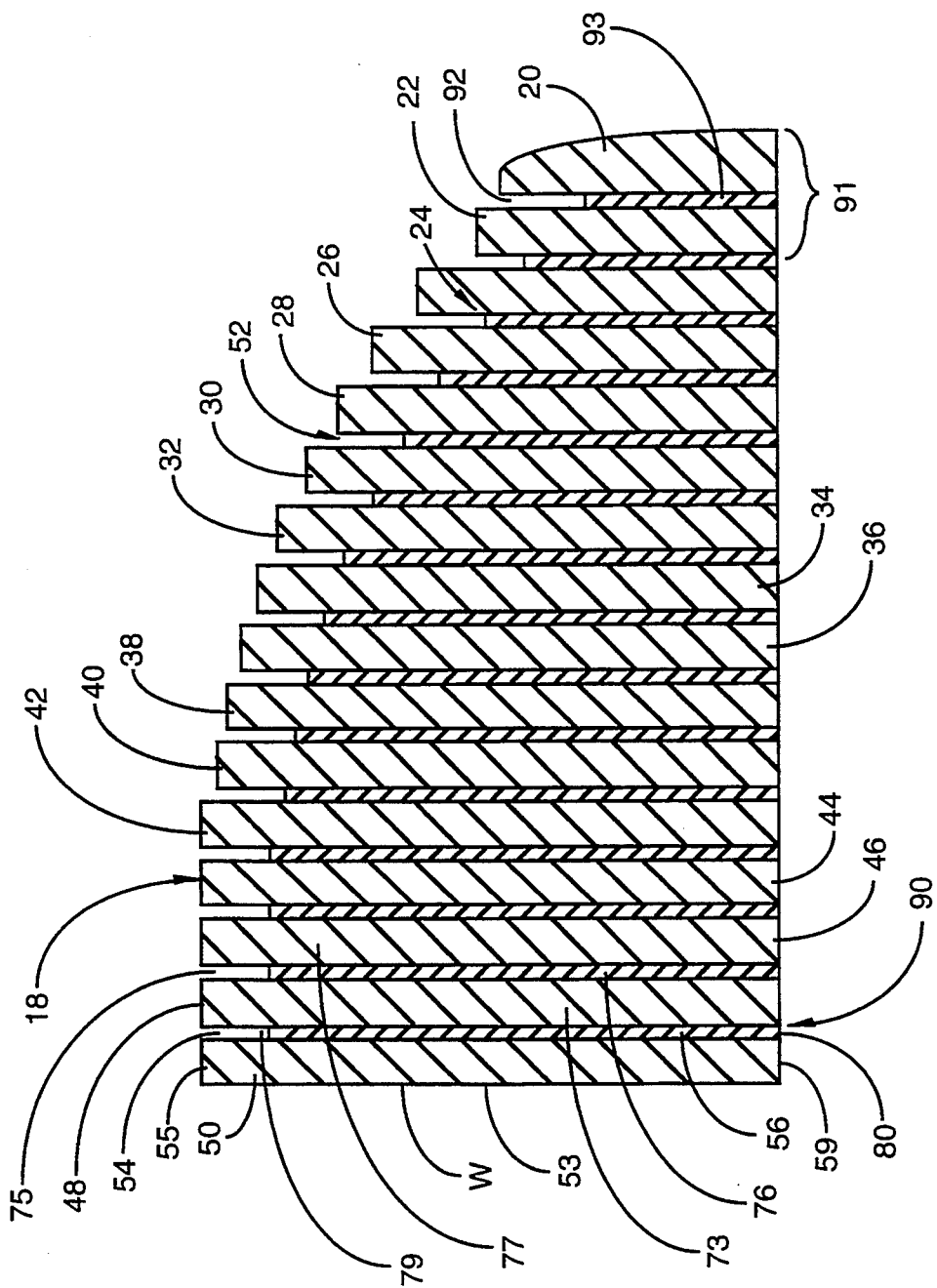
FIG. 2 is an enlarged view of a portion of the cross-sectional hollow cathode of FIG. 1.
Figure 3:
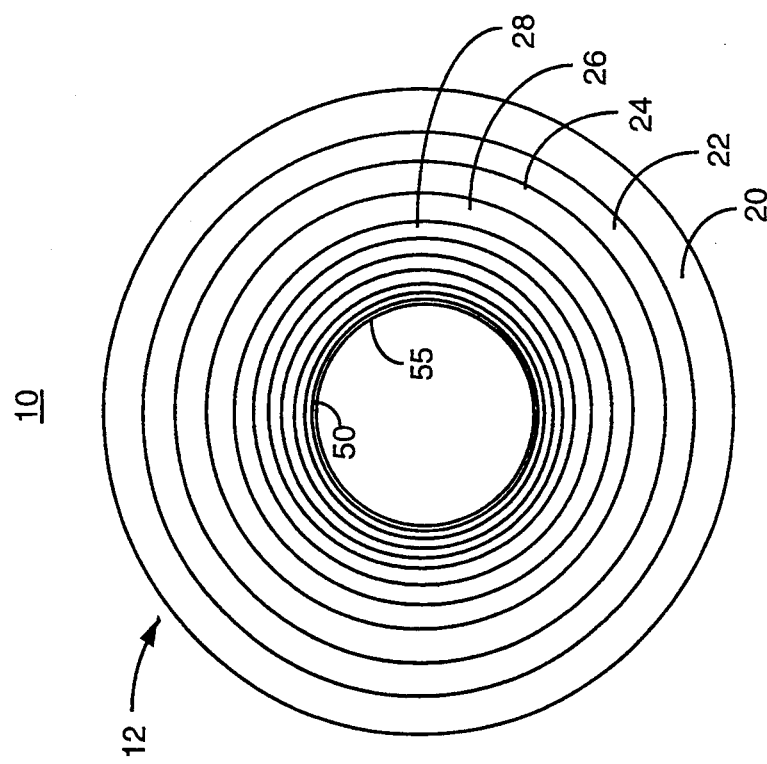
FIG. 3 is an end view of the hollow cathode of FIG. 1, as viewed from an oppositely disposed anode in the gas discharge device.

Referring now to the drawings, and more particularly to FIGS. 1, 2 and 3 thereof, there is illustrated a schematic side view of a hollow electrode gas discharge device 10, such as a laser, a gaseous switch, a flash lamp.

The gas discharge device 10 generally includes a cathode 12, an anode 14 that is oppositely disposed relative to the cathode 12, and a plasma or gas chamber 16 that is located intermediate the cathode 12 and the anode 14. Electrons are generated at the cathode 12 and travel to the anode 14 through the gas chamber 16. The cathode 12 and the anode 14 are connected to a power source which is indicated by a (+) and a (−).

In the preferred embodiment, the anode 14 includes a conventional design that is commonly known in the art. The construction of the cathode 12 is novel, and allows it to be efficiently used in high-pressure, high-power gas discharge devices. When AC discharge is used, the hollow cathode design can also be applied to the anode.

FIG. 2 illustrates an enlarged section 18 of the cathode 12 of FIG. 1, inside a dashed circle C. The cathode 12 is a hollow type cathode, which includes a plurality of cathode elements 20, 22, 24, 26, 28, 30, 32, 32, 36, 38, 40, 42, 44, 46, 48 and 50. While sixteen (16) cathode elements 20–50 are illustrated, it should become apparent to those skilled in the art, after reviewing the present specification, that different applications for the gas discharge device could require a different number of electrode elements.

The cathode elements 20–50 are closely "packed" relative to each other, such that two adjacent cathode elements, i.e. elements 48 and 50, are parallel to each other. The adjacent cathode elements are spaced apart by corresponding hollow spaces, as exemplified by a space 54 between the cathode elements 48 and 50. These hollow spaces, such as space 54 are made with an appropriate spacer material, such as a spacer 56, which fills the space 54. The hollow spaces and the corresponding spacers are interleaved with cathode elements 20–50. In effect, the current hollow cathode 12 becomes a combination of several individual hollow cathodes that are sequentially arranged.

Considering now the outermost cathode element 50 in greater detail, it is illustrated in FIG. 3 as including an outermost disc 53 that is defined by a circular inner periphery 55 and a circular inner periphery 59 (FIG. 1). The inner periphery 55 is defined by an inner radius Ri, and the inner periphery 59 is defined by an inner radius Ro. The inner periphery 55 and the inner periphery 59 are concentrically disposed relative to each other, with respect to a geometric center 60.

The outermost cathode element 50 further includes an inner circular opening 63, which is defined by the inner periphery 59. The disc 53 has a radial width W which is equal to the difference between the outer radius Ro and the inner radius Ri, as shown by the following equation:

$$W = Ro - Ri.$$

The radial width W of the disc 53 varies with the intended application of the gas discharge device 10. The main limitation on the selection of the thickness of the disc 53 is the space and size limitation of the gas discharge device 10. The disc 53 could be made of highly conductive metal, such as copper, tungsten, aluminum, etc.

FIG. 2 illustrates the various cathode elements 20–50 as having different inner radii Ri, and equal outer radii Ro. While FIG. 2 illustrates the five adjacent cathode elements 42, 44, 46, 48 and 50 as having equal inner radii Ri, it should be understood that, for different applications the inner radii Ri of the cathode elements 20–50 could be selected differently.

For example, in a first application as shown in FIGS. 1 and 2, all the cathode elements 20–50 have the same outer radius Ro. Alternatively, the cathode elements 20–50 could have differing outer radii Ro from each other, e.g. cathode elements 20–32 could have the same outer radius Ro1, while the remaining cathode elements 34–50 could have the same outer radius Ro2, such that Ro1 is different from Ro2.

The inter-element spaces are defined by the discs of the two adjacent and successive cathode elements. For illustration purpose, a first space 54 is defined between the disc 53 of the outermost cathode element 50, and the disc 73 of the cathode element 48. Similarly, a second space 75 is defined between the disc 73 of the cathode element 48 and a corresponding disc 77 of the cathode element 46. Similarly, the remaining spaces are interleaved with the adjacent cathode elements.

These inter-element spaces, such as 54 and 75, are filled with corresponding spacers, such as spacers 56 and 76, respectively. In the present example, the spacers do not completely fill the corresponding spaces, but rather a significant space portion between the adjacent discs. It should however be understood that the portion of the inter-elements spaces that are filled with the spacers varies with the applications.

Considering now, as an example, the spacer 56 in greater detail, the spacer 56 is disc shaped, with a central portion thereof removed. The spacer 56 is limited by a circular outer periphery 79, and by a concentric circular inner periphery 80. The outer periphery of the spacer 56 corresponds to the outer periphery 55 of the cathode element 50.

As used herein, the term "depth" of the hollow gap i.e. 54, defines the radial distance between the spacer outer periphery, i.e. 79, and the outer periphery of the adjacent element, i.e, 55.

The term "thickness" of the hollow gap, i.e. 54, is defined as the distance between two adjacent cathode elements, i.e. elements 48 and 50 with spacer 56 in between. The inter-element space which forms the individual hollow cathode is designed to accommodate the gas pressure for efficient electron emission. In general, the preferable thickness of the hollow gap, which is controlled by the spacer thickness, can range between 5 mils and 20 mils. It should however be understood that values outside this range can also be selected.

The depth of the hollow gap is dependent on the thickness of the spacers. In the preferred embodiment, the depth is proportional to the thickness with the depth of an individual spacer ranging between 10 to 20 times the thickness of an individual spacer. However, it should be understood to those skilled in the art, that other values could alternatively be selected.

The spacers are preferably made of the same conductive material as the cathode elements. However, different materials could alternatively be selected.

The terms "effective hollow-gap volume" refer to the volume of the inter-element space. In the present application, the effective hollow-gap volume is equal to the depth of the hollow gap, i.e. 54, multiplied by the thickness of that hollow gap.

The terms "effective hollow cathode space" define the sum of the effective hollow-gap volumes of all the cathode elements 20–50.

The terms "individual hollow cathode" refer to the hollow cathode that is formed by two successive cathode elements, and the space and spacer therebetween. For illustration purpose, the outermost individual hollow cathode 90 is formed by the cathode elements 48, 50; the space 54; and the spacer 56. The innermost individual hollow cathode 91 is formed by the two successive innermost cathode elements 20, 22; a space 92 therebetween; and a spacer 93 that forms the space 92.

Figure 8:
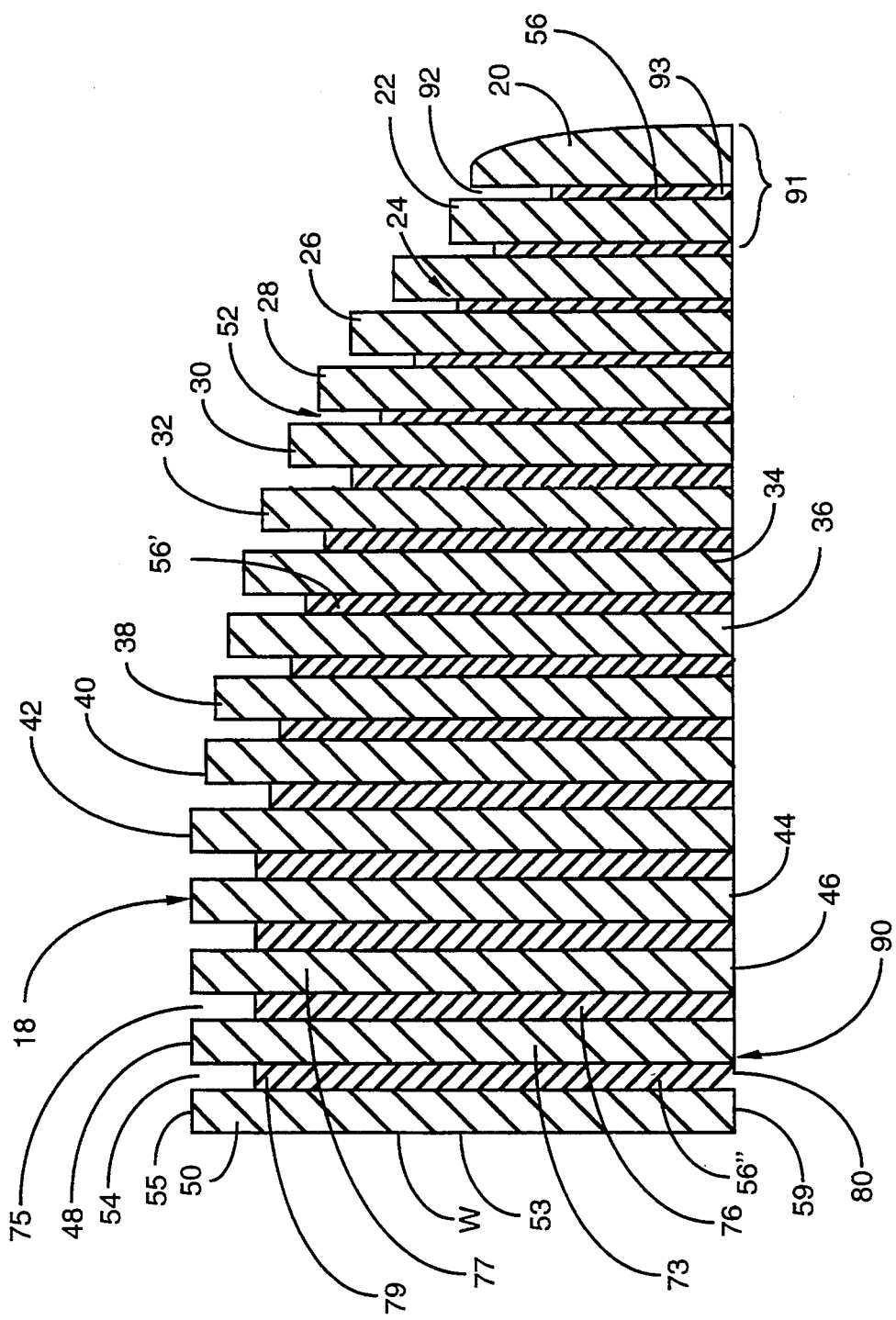
FIG. 8 is an enlarged view of a portion of the cross-sectioned hollow cathode of FIG. 1 wherein various ones of the spacers are of different thicknesses.

While the inter-element spaces and corresponding spacers are illustrated in FIG. 2 as having identical thicknesses, it should be understood to those skilled in the art that these inter-element spaces and spacers could alternatively have different thicknesses as illustrated by the example embodiment of FIG. 8.

Therefore, another significant advantage of the present invention is that the electron emission from each individual hollow cathode, such as the individual hollow cathode 90, can be varied, by varying its hollow gap thickness and depth. This design is useful in certain instances and applications, where the discharge device 10 does not generate a spatially uniform field distribution.

For instance, when the design error of the cathode exceeds a certain design tolerance, the electron emission across the cathode 12 becomes non-uniform. For instance, there could be a higher density electron emission across some of the individual hollow cathode, i.e. the individual hollow cathode 91, while the electron emission across the remaining individual hollow cathodes, i.e., the individual hollow cathode 90, is lower. This non-uniformity would cause discharge instability and shorten the durability of the hollow cathode 12.

Since it would normally be desirable to maintain a uniform electron emission across the cathode surface, one way to redress the non-uniformity of the electron distribution, is to use a variable spacing hollow cathode 12. In one application, the individual hollow cathodes that are further away from the anode 14, i.e. the individual hollow cathode 90, would have a lower density electron emission, and consequently, they would require more efficient hollow cathode gap by using thinner spacer, i.e. the spacer 56, than the spacers of the individual hollow cathodes that are closer to the anode 14, i.e. the individual hollow cathode 91.

Such variable design freedom of the individual hollow cathodes, will improve the design and profile of the gas discharge device 10, particularly when limited space is available for profiling a uniform-field electrode or cathode 12.

The elements 20–50 of the hollow cathode 12, and the hollow spacers therebetween, can be bonded together, such as diffusion bonding, in order to improve heat conduction. When precision machining, such as electrical—discharge machining or laser machining, each individual hollow gap can also be machined from a single solid piece electrode, instead of being formed with multiple disk elements. Experiments have shown that a multi-element hollow cathode 12 made of diffusion-bonded copper elements 20–50 has yielded noticeable improvement at higher gas pressures in copper laser discharges over prior art gas discharge devices.

The operation of the present new hollow electrode gas discharge device 10 is significantly improved over the conventional hollow electrode discharge devices, in that significantly more electrons are generated within the multi-element cathode 12.

In conventional hollow cathode discharge devices, the generated power is considered as "low-power", in that it does not effectively exceed one kilowatt. On the other hand, the present hollow cathode gas discharge device 10 is a high-power discharge device. By "high-power" it is meant greater than one (1) kilowatt (KW) of power is generated. In certain applications, it would be possible to generate 100 KW with the present gas discharge device 10.

In the present high-power hollow cathode gas discharge device 10, the current density at the cathode 12 is not very high, even though the overall cathode discharge current requirement is high. In the gas discharge device 10, the electron emission is very efficient, due to the cascaded multi hollow-gap arrangement, which would cause the current to gradually add up, and not to be concentrated on a single hollow gap.

As a result, since a high current density is not generated in an individual hollow gap, i.e. 54 of the cathode 12, a high cathode-fall voltage is not required. Therefore, the cathode 12 will have a relatively small electrical impedance, and consequently, relatively small thermal energy is deposited at the cathode 12, resulting in less thermal induced discharge instability.

Therefore, the present cathode arrangement leads to a more stable discharge, and less electrode sputtering. Accordingly, the durability of use of the high-power gas discharge device is significantly improved.

In conventional gas discharge devices, when the pressure within the gas chamber increases, the hollow cathode effect decreases, which results in inefficient and unstable discharge. On the other hand, the gas discharge device 10 according to the present invention, the effective hollow cathode space is significantly increased, resulting in a more efficient discharge at gas pressures higher than those used in conventional hollow-cathode devices.

In the present application, the power source is a DC (direct current) power source. However, it should be understood that the present hollow cathode arrangement can be used with an AC (alternative current) power source. The DC voltage between the anode 14 and the cathode 12 is generally in the range of multi-kilovolts (KV), such as 10 to 100 KV's.

For this purpose, both electrodes, i.e. the anode and the cathode, are similarly designed, and have a similar configuration to the hollow cathode 12 of the present invention. A gas discharge device having this configuration is referred to as "dual hollow electrode" high-power, high-pressure gas discharge device. In certain applications, such a dual hollow electrode gas discharge device could also be used with a DC current source.

Figure 4:
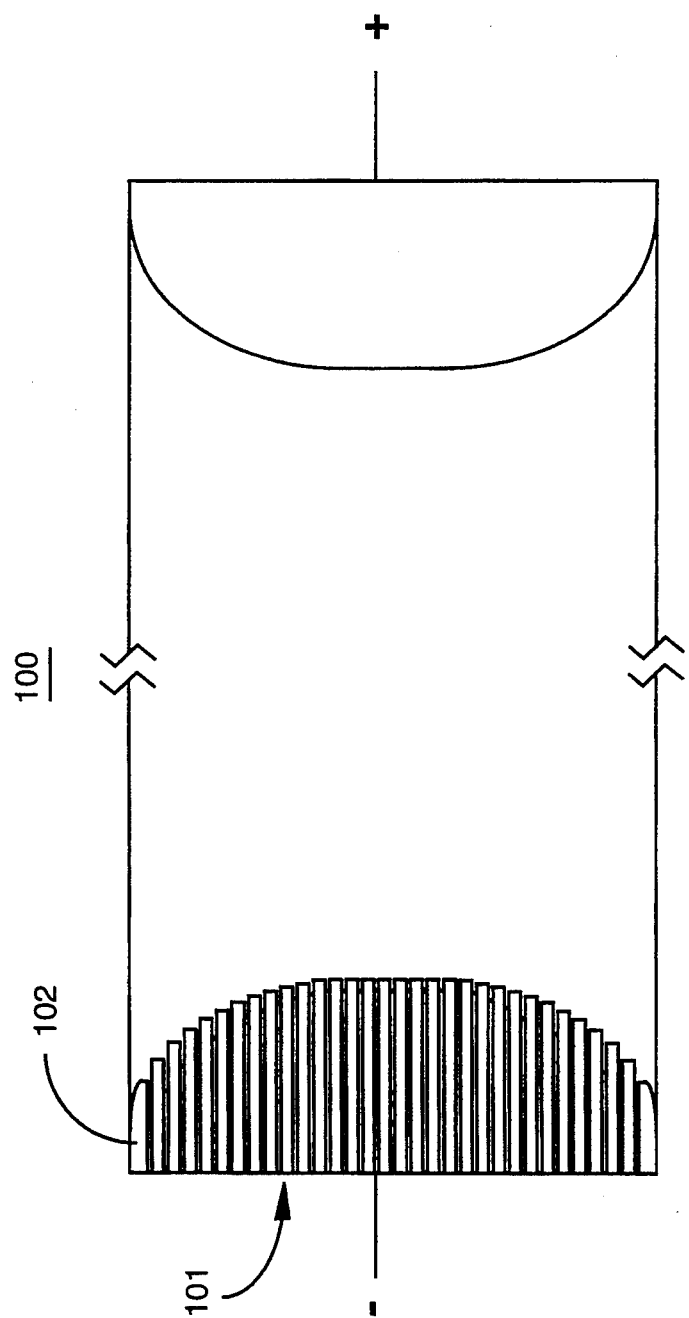
FIG. 4 is a schematic side view of another gas discharge device using a second embodiment of the hollow cathode according to the present invention.

The hollow electrode gas discharge device 10 shown in FIGS. 1 through 3 is referred to as longitudinal discharge device, which refers to a discharge device with a large separation between the anode and cathode. FIG. 4 illustrates a hollow gas discharge device 100 shown which is referred to as transverse gas discharge device, which refers to a discharge device with small separation between the anode and cathode.

The gas discharge device 100 is basically similar in function to the gas discharge device 10, with the exception that it includes a transverse discharge type hollow cathode 101. The hollow cathode 101 includes a plurality of flat cathode elements, such as the element 102.

Figure 5:
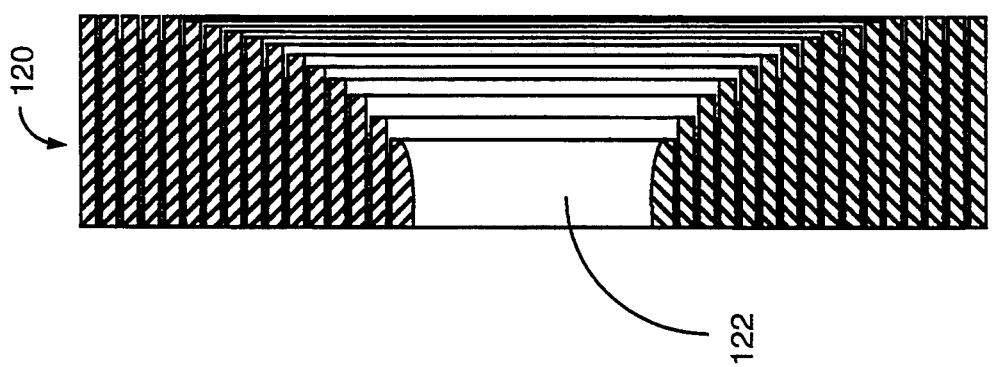
FIG. 5 is a cross-sectional schematic side view of a third embodiment of the hollow cathode according to the present invention.

FIG. 5 is a schematic side view of a third embodiment of the hollow cathode 120 according to the present invention. The hollow cathode 120 is similar to the cathode 12 of FIG. 1, but uses cylindrically shaped elements.

Figure 7:
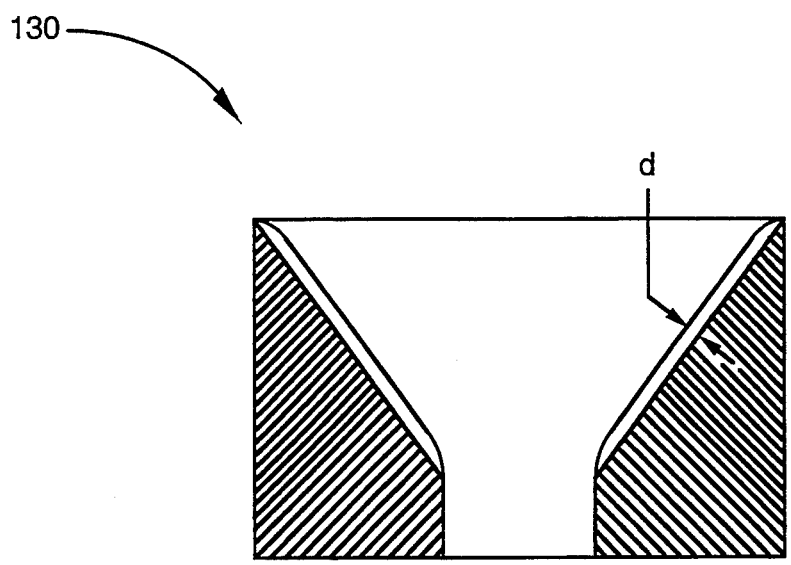
FIG. 7 is a cross-sectional view of the hollow cathode of FIG. 6, along line 7—7 thereof.
Figure 6:
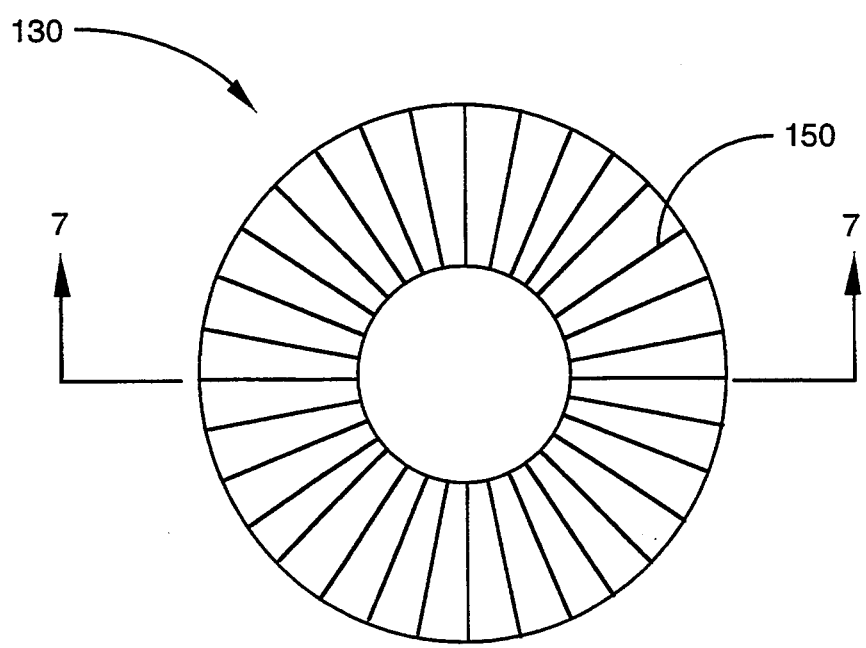
FIG. 6 is a schematic of a fourth embodiment of the hollow cathode according to the present invention.

FIGS. 6 and 7 are schematic views of a fourth embodiment of the hollow cathode 130 according to the present invention. The hollow cathode 130 is precision machined from a single solid piece electrode. The hollow gaps, such as the gap 150, are radially machined to a desired thickness and depth d.

While specific embodiments of the gas discharge device have been illustrated and described, in accordance with the present invention, modifications and changes of the apparatus, parameters, materials, methods of manufacture, etc. will become apparent to those skilled in the art, without departing from the scope of the invention.

What is claimed is:

1. A gas discharge device comprising:
a gas chamber;
an anode within said gas chamber; and
an angularly shaped cold cathode within said gas chamber spaced apart from said anode, said cold cathode having a height, $h_1$, along a central axis therethrough defined by said annular shape forming an inner surface and an outer surface, said inner surface having a minimum inner diameter of $d_{1min}$ at one end of $h_1$, a maximum inner diameter of $d_{1max}$ at the other end of $h_1$ and said outer surface having an outer diameter of $d_2$, each defined relative to said central axis wherein $d_2 > d_{1max} > d_{1min}$, said cathode being oriented with said minimum inner diameter end farthest from said anode and said maximum inner diameter end closest to said anode, formed in said inner surface are a plurality of annular grooves each of a selected depth and width defining two sides thereof with said sides being perpendicular to said central axis, said plurality of annular grooves divide said inner surface into a plurality of N annular regions each having an inner diameter of $d_{1n}$ where N is at least 2 with $d_{11} = d_{1min}$ and $d_{1N} = d_{1max}$.

2. A gas discharge device as in claim 1 wherein said plurality of annular grooves are equally spaced one from the other throughout the height, $h_1$, of said cold cathode.

3. A gas discharge device as in claim 1 wherein each of said plurality of annular grooves have the same width.

4. A gas discharge device as in claim 1 wherein each of said plurality of annular grooves have an individually selected depth.

5. A gas discharge device as in claim 1 wherein each of said plurality of annular grooves have an individually selected width.

6. A gas discharge device comprising:

a gas chamber;

an anode within said gas chamber; and an angularly shaped cold cathode within said gas chamber spaced apart from said anode, said cold cathode having a height, $h_1$, along a central axis therethrough defined by said annular shape forming an inner surface and an outer surface, said inner surface having a minimum inner diameter of $d_{1min}$ at one end of $h_1$, a maximum inner diameter of $d_{1max}$ at the other end of $h_1$ and said outer surface having an outer diameter of $d_2$, each defined relative to said central axis wherein $d_2 > d_{1max} > d_{1min}$, said cathode being oriented with said minimum inner diameter end farthest from said anode and said maximum inner diameter end closest to said anode, formed in said inner surface and opening to said $d_{1max}$ end of said cold cathode are a plurality of circular grooves each of a selected depth and width defining two sides thereof with said sides being parallel to said central axis, said plurality of grooves divide said inner surface into a plurality of N circular regions each having a progressively larger diameter of $d_{1n}$ where N is at least 2 with $d_{11} > d_{1min}$ and $d_{1N} < d_{1max}$.

7. A gas discharge device as in claim 6 wherein said plurality of grooves are equally spaced one from the other.

8. A gas discharge device as in claim 6 wherein each of said plurality of grooves have the same width.

9. A gas discharge device as in claim 6 wherein each of said plurality of grooves have an individually selected depth.

10. A gas discharge device as in claim 6 wherein each of said plurality of grooves have an individually selected width.

11. A gas discharge device comprising:

a gas chamber defining a central longitudinal axis therein and an inner circumference thereof of side walls that are parallel to said central longitudinal axis;

an anode within said gas chamber; and a transverse cold cathode having a convex surface within said gas chamber spaced apart from said anode, said cold cathode having a height, $h_1$, at a central point along said central axis of said gas chamber and a height, $h_2$, around said inner circumference of said gas chamber wherein $h_1 > h_2$, said cathode being oriented with said central point closest to said anode, formed in said convex surface of said cold cathode and opening toward said anode are a plurality of parallel grooves each of a selected depth and width defining two sides thereof, said plurality of grooves divide said convex surface into a plurality of N parallel regions where N is at least 2.

12. A gas discharge device as in claim 11 wherein said plurality of grooves are equally spaced one from the other.

13. A gas discharge device as in claim 11 wherein each of said plurality of grooves have the same width.

14. A gas discharge device as in claim 11 wherein each of said plurality of grooves have an individually selected depth.

15. A gas discharge device as in claim 11 wherein each of said plurality of grooves have an individually selected width.

16. A gas discharge device comprising:

a gas chamber;

an anode within said gas chamber; and an annularly shaped cold cathode within said gas chamber spaced apart from said anode, said cold cathode having a height, $h_1$, along a central axis therethrough defined by said annular shape forming an inner surface and an outer surface, said inner surface having a constant inner diameter of $d_{1min}$ at one end of $h_1$ and extending a selected distance from said end and a linearly increasing inner diameter from said selected distance to a maximum inner diameter of $d_{1max}$ at the other end of $h_1$ and said outer surface having an outer diameter of $d_2$, each defined relative to said central axis wherein $d_2 \geq d_{1max} > d_{1min}$, said cathode being oriented with said minimum inner diameter and farthest from said anode and said maximum inner diameter end closest to said anode, formed in said portion of said inner surface wherein said inner diameter is linearly varying with a plurality of radially extending grooves each of a selected depth and width defining two sides thereof, said plurality of annular grooves divide said inner surface into a plurality of N radial regions.

17. A gas discharge device as in claim 16 wherein said plurality of grooves are equally spaced one from the other.

18. A gas discharge device as in claim 16 wherein each of said plurality of grooves have the same width.

19. A gas discharge device as in claim 16 wherein each of said plurality of grooves have the same depth.

* * * * *